O. L. CHILCOTT.
FOUNTAIN OR BAR SERVICE APPARATUS.
APPLICATION FILED OCT. 3, 1914.
1,183,953.
Patented May 23, 1916.
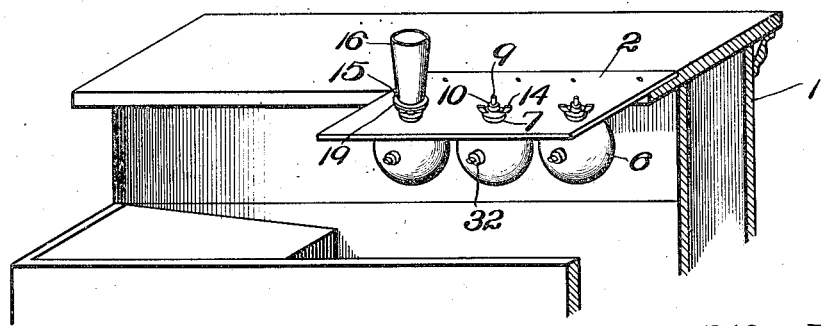
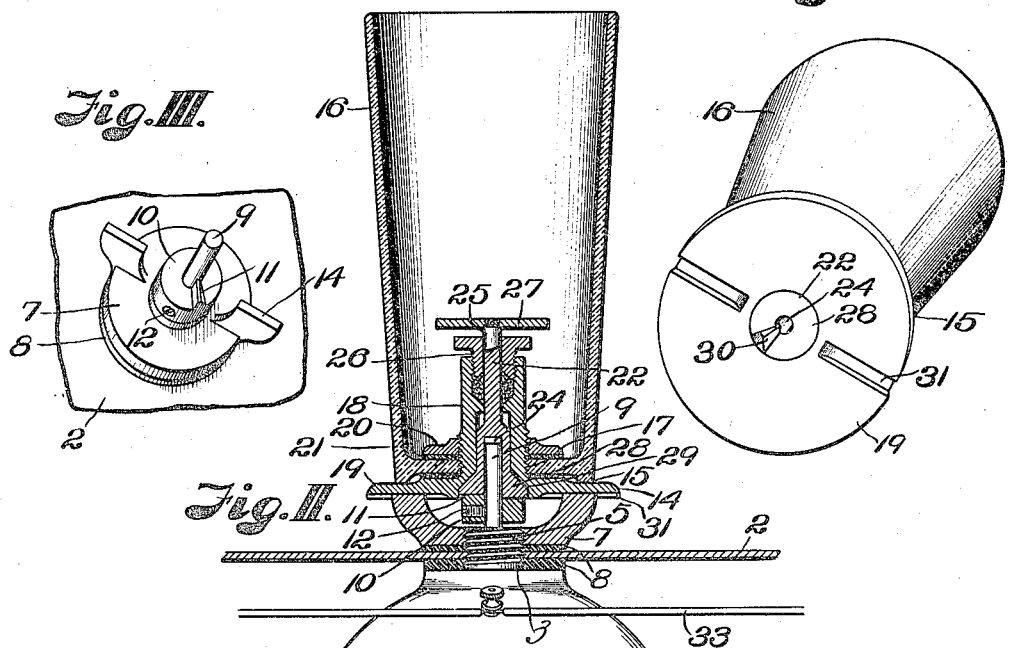
WITNESSES:
Arthur W. Capa.
Lynn A. Robinson.
INVENTOR
O. L. Chilcott.
BY
Arthur C. Brown
ATTORNEY

UNITED STATES PATENT OFFICE.

OHLEN L. CHILCOTT, OF KANSAS CITY, MISSOURI.

FOUNTAIN OR BAR SERVICE APPARATUS.

1,183,953. Specification of Letters Patent. Patented May 23, 1916.

Application filed October 3, 1914. Serial No. 864,899.

*To all whom it may concern:*

Be it known that I, OHLEN L. CHILCOTT, a citizen of the United States, residing at Kansas City, in the county of Jackson and State of Missouri, have invented certain new and useful Improvements in Fountain or Bar Service Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to drink mixing apparatus, and has for its principal object to provide a device of this character for use on bars or soda-fountains, wherein the rotor or stirring element is mounted permanently in the bottom of a container within which a drink may be served and may be operatively connected with a driving element upon which the container is supported, to obviate the necessity of projecting the rotor or stirring element into the container from the top. In accomplishing this object I have provided the improved details of structure hereinafter described and illustrated in the accompanying drawings wherein:—

Figure I is a perspective view of a portion of a bar or fountain equipped with a mixing apparatus constructed according to my invention. Fig. II is a vertical sectional view of one of the mixers; the motor being shown in full lines. Fig. III is a top perspective view of the driving clutch. Fig. IV is a bottom perspective view of the container.

Referring more in detail to the parts:—1 designates a bar or fountain of any ordinary design, and rigidly mounted on and projecting from the rear edge of said bar is a plate 2, having a plurality of apertures 3. Projecting through each of the apertures 3 is the threaded neck 5 of a motor 6, and threaded onto said neck is a nut 7 which may be tightened to hold the motor rigidly in place, a packing washer 8 being preferably inserted on each side of the plate 2 to prevent liquid from flowing through the apertures 3 onto the motor. The armature shaft 9 of the motor is revolubly mounted in and projects above the neck 5 and is provided with a clutch collar 10, having a driving dog 11 fixed thereon and rigidly secured to the shaft by a set screw 12.

The nut 7, which holds the motor in place, is provided with wings 14 which are used to tighten the nut and are adapted for supporting a container 15. Said container comprises a glass tumbler 16 and a base plate 19, the latter having a base aperture 17 through which the threaded neck 18 of base plate 19 is projected, and threaded onto the neck 18 is a nut 20 which clamps packing washers 21 tightly against the top and bottom faces of the tumbler base.

Revolubly mounted in a gland 26 in the neck 18 is a shaft 22, which carries a stirring disk 27, the lower end of the shaft 22 being expanded into a tapered head 28, which contacts with a tapered seat 29 in the base plate 19, and is provided with a notch 30 for receiving the driving dog 11 on the collar 10 that is fixed to the motor shaft 9.

In order to prevent the container from turning when the motor is in operation, I provide the base plate 19 with grooves 31 for receiving the wings 14 of the nut 7, which support the tumbler independently of the drive shaft.

The motor is provided with a snap switch 32 for starting and stopping the same and with line wires 33 which may be connected to any suitable source of electrical energy.

In using the device, the ingredients of a mixed drink are placed in the container 15 and the container placed on the driving mechanism, so that the motor shaft 9 enters the aperture 29 in the stirrer disk shaft 22, the dog 11 on the stirrer disk shaft head enters the notch 30 in the motor shaft collar, and the wings 14 on the motor keeper nut project into the grooves 31 in the container base, whereupon the switch 32 may be turned and the motor started to revolve the stirring disk 27. When the beverage is thoroughly mixed the motor is stopped and the container removed, by simply lifting it.

It is apparent that the container may be placed in position or removed without stopping the motor, and that by providing the special mounting herein described the motors are kept perfectly dry. It is also apparent that as the rotor stirring element is contained within the bottom of the tumbler or container, the contents of the latter will no be splashed from the container, and that the latter may be used to serve the drink, or the contents emptied into a separate service glass.

Having thus described my invention, what I claim as new therein, and desire to secure by Letters-Patent, is:—

1. The combination with a supporting member, of a container having a base part adapted for resting on the supporting member and for anchoring thereto, to prevent rotation of the container, a rotatable member opening through the container base, a stirrer on said rotatable member within the container, a motor shaft, and clutch members on the motor shaft and said rotatable element, adapted for coöperation to actuate the stirrer, for the purpose set forth.

2. The combination with a container, of a base plate having a neck projected through the bottom of the container, a shank rotatably mounted in said neck and having a head at its lower end provided with a clutch face and having a central bore, a stirrer on the inner end of said shank, adapted for rotation within the container, a supporting member adapted for locking engagement with the container base, to prevent rotation of the container, and a motor shaft projected into the shank bore and having a clutch face, adapted for coöperative engagement with the shank head, for the purpose set forth.

3. The combination of a container having a bottom provided with a central aperture, a motor having a vertical shaft, a wing nut arranged adjacent the shaft, a base plate fixed to the container and removably anchored to the wings of said nut, and a stirrer in the container adapted for clutch connection with the motor shaft through the bottom aperture.

4. The combination with a container having a bottom wall provided with a central aperture, of a neck fixed to the bottom wall and projected through the aperture, packing surrounding the neck, a shaft journaled in the neck and having a clutch face at its lower end, a stirrer fixed to the shaft within the container, a clutch member on the shaft arranged for coöperation with the clutch on the stirrer shaft, and means for anchoring the container to prevent rotation thereof with the stirrer.

5. The combination with a container comprising a bottom wall having an aperture therein, of a plate having a neck projected through said aperture, means for clamping the plate to the container, the said plate being provided with a seat and the neck with a channel concentric with said seat, a shaft rotatably mounted in the neck and having a head in the plate seat, and having a central bore extending through said head into the shaft, a stirrer on the shaft within the container, a motor having a shaft adapted for projection into the bore in the stirrer shaft, clutch members on the stirrer and motor shaft, and means for anchoring the container to prevent rotation thereof with the stirrer.

6. The combination with a container having an apertured bottom, of a plate fixed to the bottom and having a neck projected through the aperture therein and having radial grooves on its under face, a shaft rotatably mounted in the neck and plate, a stirrer on the shaft within the container, a motor having a shaft in clutch relation to the stirrer shaft, and a wing nut for supporting the motor and having members projected into the plate grooves, for the purpose set forth.

7. The combination with a supporting plate, of a motor having a threaded shank projected through said supporting plate, a wing nut on the shank for attaching the motor to the supporting plate, a shaft operable from the motor and projecting between said wings, a plate having grooves in its under face for receiving the wing members, and having a hollow neck projecting thereabove, a shaft rotatably mounted in the neck in clutch relation to the motor shaft, a container seated on said plate and having an apertured bottom through which the neck is projected, a nut on said neck for clamping the container to the grooved plate, a shaft rotatably mounted in the neck and having clutch relation with the motor shaft, and a stirrer on said shaft within the container.

In testimony whereof I affix my signature in presence of two witnesses.

OHLEN L. CHILCOTT.

Witnesses:
LYNN O. ROBINSON,
LETA E. COATS.